(12) United States Patent
Kretschmann et al.

(10) Patent No.: US 11,472,430 B2
(45) Date of Patent: Oct. 18, 2022

(54) SYSTEM AND METHOD FOR DETERMINING A WET ROAD CONDITION

(71) Applicant: CONTINENTAL AUTOMOTIVE GMBH, Hannover (DE)

(72) Inventors: Matthias Kretschmann, Munich (DE); Andrei-Stefan Cimponeriu, Munich (DE)

(73) Assignee: Continental Automotive GmbH, Hannover (DE)

( * ) Notice: Subject to any disclaimer, the term of this patent is extended or adjusted under 35 U.S.C. 154(b) by 214 days.

(21) Appl. No.: 17/026,515

(22) Filed: Sep. 21, 2020

(65) Prior Publication Data
US 2021/0086786 A1 Mar. 25, 2021

(30) Foreign Application Priority Data

Sep. 20, 2019 (EP) .................................... 19465562
Sep. 26, 2019 (GB) .................................... 1913864

(51) Int. Cl.
*H04N 5/44* (2011.01)
*B60W 50/14* (2020.01)
*H04B 17/318* (2015.01)

(52) U.S. Cl.
CPC .......... *B60W 50/14* (2013.01); *H04B 17/318* (2015.01); *B60W 2050/143* (2013.01); *B60W 2520/26* (2013.01); *B60W 2555/20* (2020.02)

(58) Field of Classification Search
CPC ........... B60W 50/14; B60W 2050/143; B60W 2520/26; B60W 2555/20; B60W 40/06; B60W 40/064; H04B 17/318; H04B 17/23
See application file for complete search history.

(56) References Cited

U.S. PATENT DOCUMENTS

| 5,521,594 A | * | 5/1996 | Fukushima | G01H 3/12 340/904 |
| 10,442,439 B1 | * | 10/2019 | Seo | B60W 40/068 |
| 2005/0087377 A1 | | 4/2005 | Boehm | |
| 2005/0172707 A1 | | 8/2005 | Kanatani et al. | |
| 2007/0142996 A1 | * | 6/2007 | Lee | B60T 7/22 701/96 |
| 2013/0035836 A1 | | 2/2013 | Mehr et al. | |

(Continued)

FOREIGN PATENT DOCUMENTS

WO 2019020536 A1 1/2019

OTHER PUBLICATIONS

Rain fade, "https://en.wikipedia.org/w/index.php?title=Rain_fade &oldid=828519483", p. 1-4, Date: Jul. 5, 2018.

*Primary Examiner* — Munear T Akki
(74) *Attorney, Agent, or Firm* — Laurence A. Greenberg; Werner H. Stemer; Ralph E. Locher

(57) ABSTRACT

A method for determining a wet road condition includes receiving a value of a received signal strength index of an RF signal received from a sensor associated with a wheel of a vehicle, comparing the value to a predetermined threshold value, and if the value is less than the predetermined threshold value, determining that a wet road condition is met and outputting a pre-aquaplaning warning signal. A system for determining a wet road condition and a non-transitory computer program product are also provided.

15 Claims, 3 Drawing Sheets

(56) References Cited

U.S. PATENT DOCUMENTS

| | | | |
|---|---|---|---|
| 2015/0251659 A1* | 9/2015 | Fischer | B60T 8/171 |
| | | | 382/104 |
| 2016/0133131 A1* | 5/2016 | Grimm | G08G 1/0112 |
| | | | 701/117 |
| 2017/0101095 A1* | 4/2017 | Nilsson | B60T 7/22 |
| 2017/0236052 A1* | 8/2017 | Israelsson | G08G 1/205 |
| | | | 706/21 |
| 2018/0293448 A1 | 10/2018 | Hartmann | |
| 2019/0047527 A1* | 2/2019 | Falconer | B60W 10/06 |
| 2019/0279497 A1 | 9/2019 | Sekizawa et al. | |
| 2020/0255020 A1* | 8/2020 | Simmons | B60W 40/068 |
| 2020/0348167 A1* | 11/2020 | Takasuka | G01D 5/48 |
| 2021/0237517 A1* | 8/2021 | Suzuki | B60C 19/00 |

\* cited by examiner

SYSTEM AND METHOD FOR DETERMINING A WET ROAD CONDITION

CROSS-REFERENCE TO RELATED APPLICATION

This application claims the priority, under 35 U.S.C. § 119, of European Patent Application EP 19465562, filed Sep. 20, 2019 and of UK Patent Application GB 1913864.3, filed Sep. 26, 2019; the prior applications are herewith incorporated by reference in their entirety.

BACKGROUND OF THE INVENTION

Field of the Invention

The present invention relates to a system and a method for determining a wet road condition. Determining a wet road condition may be used to assist and/or increase the reliability of the detection of a pre-aquaplaning condition of a vehicle. The invention also relates to a non-transitory computer program product for carrying out the method.

Aquaplaning or hydroplaning describes the phenomenon of a tire of a vehicle floating on a film of water on a wet road. A wedge of water is pushed under the tire contact area which results in a loss of adhesion between the tire and the road. Therefore, during aquaplaning, steering and braking forces cannot be transferred from the vehicle through the tires to the road so that the vehicle could not be controlled, even by active vehicle control systems. Therefore, it would be desirable to identify a risk of aquaplaning before the state of aquaplaning actually occurs in order that the driver driving the vehicle or an active vehicle control system can take appropriate action to avoid aquaplaning occurring.

International Publication WO 2019/020536 A1 discloses a method for monitoring a behavior of a tire of the vehicle to determine the risk of aquaplaning, before aquaplaning takes place, in which an asymmetry between a leading side and a trailing side of the tire's footprint is determined. U.S. Patent Application No. 2018/293448 A1 discloses a method for determining a wet road condition using a camera to determine and evaluate the characteristic properties of spray water at and in the surrounding space of one or more wheels of the vehicle in order to determine an increased risk of aquaplaning. However, further improvements to more reliably and easily determine conditions, which are indicative of a risk of aquaplaning, are desirable.

BRIEF SUMMARY OF THE INVENTION

It is accordingly an object of the invention to provide a system and a method for determining a wet road condition, which overcome the hereinafore-mentioned disadvantages of the heretofore-known systems and methods of this general type.

With the foregoing and other objects in view there is provided, in accordance with the invention, a method for determining a wet road condition, which comprises receiving a value of the Received Signal Strength Index (RSSI) of an RF (Radio Frequency) signal that is transmitted from a sensor associated with a wheel of a vehicle. The value of the RSSI of the RF signal is compared to a predetermined threshold value and, if the value of the RSSI of the RF signal is less than the predetermined threshold value, it is determined that a wet road condition is met and a pre-aquaplaning warning signal is output.

The Received Signal Strength Index (RSSI) of an RF signal is a relative unit that denotes the power of the RF signal that a device is receiving. The higher the RSSI value, the better the signal strength. Some systems use a negative scale so that a value of the RSSI closer to 0 indicates a higher signal strength.

RF signals are influenced by a phenomenon referred to as rain fade which refers to the absorption of a radio frequency signal by atmospheric rain. Therefore, the RSSI of an RF signal transmitted through a path that contains droplets of water, such as the case of water splashed by the wheels of a vehicle when the vehicle is running on a wet surface, such as a wet road, is less than the RSSI value of that signal transmitted in dry conditions.

The sensor is typically part of a further component that is fitted to the wheel of the vehicle and, therefore, is associated with that wheel. The sensor, or the component including the sensor, may also be fitted to the vehicle body work and be positioned adjacent the wheel and, therefore, be associated with that wheel.

The wheel-fitted component (WFC) hosting the sensor is associated with a wheel of the vehicle, for example, attached to the wheel of the vehicle, while the receiver receiving the RF signal may be positioned within or under the vehicle. This configuration means that the propagation path of the RF signal from the sensor to the receiver includes the surroundings of the wheel where water is splashed when the wheel is running on a wet surface such as a wet road. The RSSI of the RF signal transmitted by the sensor will be affected by the presence of water between the sensor at the wheel of the vehicle and the receiver.

Therefore, the RSSI values measured by or received by the receiver device can be compared to predetermined or reference RSSI values that are known to correspond to a dry condition of the road. If the received RSSI values are lower than the reference RSSI values, this is indicative of a wet road and an increased risk of aquaplaning.

The RSSI value depends not only on the RF transmission characteristics of the propagation environment, but also on the geometry of the propagation path. For instance, when the sensor is close to the brake caliper, less of its emitted power gets through and is received, so that the RSSI corresponds to a small RF signal. This amounts to a dependence of the RSSI values not only on a dry or wet road condition, but also on the rotation angle of the wheel that hosts the sensor. The rotation angle is typically provided by an ABS/ESP sensor on each wheel and can be made available to the receiver/processing unit.

In some embodiments, the value of the RSSI may be received. In other embodiments, the RF signal that is transmitted by the sensor is received and the RSSI of the RF signal is then determined from the received RF signal.

In some embodiments, an average value of the RSSI may be used in the method. By averaging several RSSI values emitted at various rotation angles, the angular dependence can be reduced. In such embodiments, the average received RSSI is compared to a reference average RSSI, to decide whether there is a wet road condition or, in some embodiments, whether there is a dry road condition.

In some embodiments, the RSSI is mapped against the angle (at reception time) of the wheel, to which the sensor emitting the RF signal is attached or associated, and the value is compared to a reference RSSI, known to correspond to a dry road condition at that same angle. Correspondingly, a dry or wet road condition decision can be taken.

In some embodiments, average or angular maps of the RSSI values for a dry road condition can be predetermined, for example measured during product development, and pre-programmed in the receiving unit/processor program memory.

In some embodiments, average or angular maps of the RSSI values for dry road conditions can be learned in situ by including the information that the road is dry. This information can be gained from or determined by using a rain sensor associated with the windshield of the vehicle, for example.

In some embodiments, the reference RSSI in dry conditions may be used as the predetermined threshold value. In some embodiments, the predetermined threshold value may be determined in relation to the reference RSSI. For example, the predetermined threshold value may be less than reference RSSI for dry conditions.

Since the distance between each of the wheels of the vehicle and, therefore, the sensor transmitting the RF signal and the receiver receiving the RF signal, may differ for each wheel, in some embodiments, a reference RSSI for dry conditions is established for a particular wheel. In some embodiments, a predetermined threshold value can be predetermined for each particular wheel or just some of the wheels, for example the two driving wheels of a two-wheel drive vehicle.

The RSSI of the RF signal transmitted by the sensor may also depend on the angular position of the wheel, since the angular position of the wheel also affects the distance between the transmitter of the sensor and the receiver. The angular position of the wheel when the RF signal is transmitted can be determined from a sensor of the ABS or ESP system associated with that wheel.

In some embodiments, the reference RSSI for dry conditions is established for the particular wheel in dependence on the angular position of that particular wheel. The predetermined threshold value may also be predetermined in dependence on the angular position of the wheel. In these embodiments, the angular position of the wheel at which the RF signal is transmitted is determined by using a sensor associated with the wheel, for example a sensor of the ABS or ESP system, and is taken into account when determining whether the wet road condition is met.

The sensor that is associated with the wheel of the vehicle may be a sensor of a tire parameter monitoring system (TPMS) which is attached to the wheel of the vehicle. The sensor may be used to determine one or more parameters associated with the tire, for example, tire pressure or temperature or radial acceleration or tangential acceleration, for example. The information associated with the signal, for example, the tire pressure or the temperature, need not play any part in the methods described herein, since it is the received signal strength index (RSSI) of the RF signal which is used in the method. Therefore, the method described herein may be performed by using components of the vehicle which primarily have a different function so that the method can be implemented cost effectively without having to include additional sensors on one or more wheels of the vehicle specifically for determining a wet road condition.

The pre-aquaplaning warning signal may be used to trigger a passive warning to a driver of the vehicle, for example an audio, visual and/or haptic warning, that there is an increased risk of an aquaplaning condition so that the driver can take appropriate action, for example, reducing the speed of the vehicle to avoid or at least reduce the risk of aquaplaning.

In some embodiments, the pre-aquaplaning warning signal is transmitted to an active vehicle control system of the vehicle, for example an ABS (Anti-locking Brake System) or ESP (Electronic Stability Program) system, so that the active vehicle control system can take control of the vehicle to avoid or at least reduce the risk of aquaplaning occurring.

In some embodiments, the pre-aquaplaning warning signal may be used to trigger both passive warning to the driver and be transmitted to an active vehicle control system. In some embodiments, a passive warning is triggered first followed by outputting a warning signal to an active vehicle control system. For example, if the driver does not respond in an appropriate manner to the passive warning, the active vehicle control system may actively control the vehicle. In some embodiments, the passive warning and the active control of the vehicle may occur at the same time.

In some embodiments, the pre-aquaplaning warning signal is transmitted to another object that is external to the vehicle. The object may be another vehicle with a suitable receiver. The pre-aquaplaning warning signal transmitted outside of the vehicle may be information and may also include a geotag indicating the geographical position of the vehicle at which an increased risk of aquaplaning has been determined. In some embodiments, the pre-aquaplaning warning signal is transmitted outside of the vehicle, to one or more other vehicles in the surrounding area, i.e. through Car2Car communication or to some other infrastructure or cloud system, i.e. through Car2X communication. It is also possible that one or more other vehicles are able to access this information, use it or update it, for example in a crowd-sourced detection and sharing similar to methods and systems used for traffic density estimation through moving vehicles.

In some embodiments, the wheel of the vehicle is a drive or driving wheel of the vehicle. The drive or driving wheel is a wheel of a motor vehicle that transmits force, transforming torque into tractive force from the tire to the road that causes the vehicle to move. Since the driving wheel is used to steer the vehicle, loss of traction between the driving wheels and the road results in a loss of steering control. By determining a wet road condition for this wheel, appropriate action can be taken to allow the wheel to be driven and traction to the road surface to be maintained.

In some embodiments, in addition to the RSSI of the received RF signal, one or more further parameters indicative of a wet road condition or an increased risk of aquaplaning may be used in the method to determine the wet road condition and output the pre-aquaplaning signal.

In some embodiments, a further second value of the received signal strength index (RSSI) of a further RF signal, for example a second RF signal, transmitted from a further sensor, for example a second sensor, associated with a further second wheel of the vehicle is received. In some embodiments, the further RF signal that is transmitted from the further sensor associated with the further wheel of the vehicle is received and the value of the RSSI of the further RF signal is determined. The second value of the RSSI is compared to a further predetermined threshold value, for example a second predetermined threshold value, and if the second value of the RSSI is less than the further predetermined threshold value and the value of the first RSSI from the first sensor is less than the first predetermined threshold value, it is determined that a wet road condition is met and the pre-aquaplaning warning signal is output. In some embodiments, the first wheel and the second wheel are driving wheels of the vehicle.

The further or second predetermined threshold value may be the same as, or differ from, the first predetermined threshold value. Since the RSSI of the RF signal from each of the sensors associated with different wheels of the vehicle may be different, this may be taken into account when determining a suitable threshold value for that wheel, or the sensor associated with that wheel.

In some embodiments, at least one further additional signal, which is a non-RF signal, indicative of a wet road condition and/or of a pre-aquaplaning condition is received. In response to this additional signal and one or more values of the RSSI meeting a pre-aquaplaning condition, it is determined that the pre-aquaplaning condition is met.

In some embodiments, therefore, an additional criterion is taken into account in determining whether a wet road condition or a pre-aquaplaning condition is met. For example, the additional signal may be a positive signal from a rain sensor associated with a windshield of the vehicle, whereby the positive signal indicates that there is rain on the windshield and, therefore, the road on which the vehicle is travelling is likely to be a wet. The positive signal may also be a signal from a camera that is used to detect a wet road, for example, it may be used to detect a spray pattern of water associated with the vehicle.

By combining different types of signal to determine a wet road condition, the reliability of the method can be increased. For example, in a tunnel, a rain sensor on the windshield will not detect rain, even though the road is wet due to the water carried into the tunnel by the previous vehicles. Therefore, in this situation, the methods described herein may be used to determine a wet road condition. In another example, in the dark, for example, at night or in a tunnel, it may be more difficult to analyze the data captured from a camera to establish the spray pattern so that the RSSI value of the RF signal from the sensor may be used either in place of or given a higher weighting in the determination of a wet road condition.

In some embodiments, the reference RSSI in dry conditions may be determined from an average of a plurality of values of the RSSI received, or determined, for the RF signal transmitted by the sensor associated with the wheel of the vehicle. For example, a plurality of values may be received or determined over a period of time in order to more accurately determine a reference value for the RSSI in dry conditions.

In some embodiments, a plurality of values of the RSSI are received, or determined, for the RF signal transmitted by the sensor associated with the wheel of the vehicle and used to determine if a wet road condition is met. For example, a plurality of values may be received or determined over a period of time in order to more accurately determine whether the RSSI value remains less than the predetermined threshold value over a period of time, or to determine if an average RSSI is less than the predetermined threshold value over a period of time in order to determine whether the wet road condition is met.

In some embodiments, the time interval between the received values of the RSSI or between the RF signals received from the sensor is substantially the same. In some embodiments, the time interval between the received values of the RSSI or received RF signal is reduced if one or more received values meet a particular criterion, for example, are less than the reference of the RSSI in dry conditions but higher than the predetermined threshold value. For example, when it starts to rain, the received RSSI may be slightly reduced but still higher than the value which is associated with a quantity of rain which is more likely to lead to an aquaplaning condition. The interval between the received RF signal and the RSSI of these signals can be reduced to increase the sampling rate in order to more exactly determine when a wet road condition is first met.

With the objects of the invention in view, there is also provided a system for determining a wet road condition. The system comprises at least one sensor emitting or transmitting an RF signal. The sensor may be attached to a wheel of a vehicle, for example, a driving wheel of the vehicle. The system also includes a receiving unit for receiving the RF signal from the sensor and a processing unit for determining the RSSI of the RF signal and for comparing the RSSI of the RF signal with a predetermined threshold value stored in a memory. The system also outputs a pre-aquaplaning warning signal if the RSSI value is lower than the predetermined threshold value. The system may be used on a vehicle, such as an automobile or heavy goods vehicle or any type of vehicle driven on a road.

The memory may be part of the processing unit or may be separate from the processing unit. The sensor may be a sensor of a tire parameter monitoring system (TPMS) and may sense tire pressure, temperature, tire radial acceleration or tire tangential acceleration. However, the physical information interpreted from the RF signal may be completely independent of the system for determining a wet road condition, since only the RSSI of the RF signal is used by the system. The processing unit may include a processor including executable instructions, i.e. processor executable instructions, such as software code, for determining the RSSI of the RF signal, comparing the RSSI with the predetermined threshold value and outputting the pre-aquaplaning warning signal. The processing unit may include executable instructions for carrying out the method of any one of the embodiments described herein.

In some embodiments, the system transmits the pre-aquaplaning warning signal to an outputting unit that outputs a passive warning signal to a driver of the vehicle, for example an audio, visual and/or haptic signal. In addition, or in place of the passive warning signal, the pre-aquaplaning warning signal may be transmitted to an active vehicle control system of the vehicle. The system may transmit the pre-aquaplaning signal by a wired transmission path or a wireless transmission path. The system may also transmit the signal to a further vehicle and/or to a further object that is outside and external to the vehicle. These transmissions outside of the vehicle are wireless.

In some embodiments, the pre-aquaplaning warning signal is transmitted to one or more further vehicles, e.g. through a Car2Car communication or to one or more further vehicles through a further infrastructure, such as a Cloud. The pre-aquaplaning warning signal may be transmitted to any object with a receiver that is external to the vehicle. The aquaplaning warning signal transmitted outside of the vehicle may also include a geotag indicating the geographical position of the vehicle at which an increased risk of aquaplaning has been determined.

The system may also further include a camera fitted to the vehicle that is configured to detect a wet road, and/or a rain sensor that is, for example, associated with a windshield of the vehicle. The system may also further receive at least one additional signal indicative of a wet road condition or of a pre-aquaplaning condition, and in response to receiving the at least one additional signal and the value of the RSSI of the received RF signal being less than the predetermined threshold value, determine that a pre-aquaplaning condition is met and output the pre-aquaplaning warning signal.

The processing unit of the system according to any one of the embodiments described herein may include processable executable instructions, for example software code, for carrying out the method of any one of the embodiments described herein.

With the objects of the invention in view, there is furthermore provided a vehicle comprising the system according to any one of the embodiments described herein.

With the objects of the invention in view, there is concomitantly provided a non-transitory computer program product comprising processable executable instructions, for example software code, for carrying out the method of any one of the embodiments described herein. The computer program product may be a storage medium.

Other features which are considered as characteristic for the invention are set forth in the appended claims.

Although the invention is illustrated and described herein as embodied in a system and a method for determining a wet road condition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
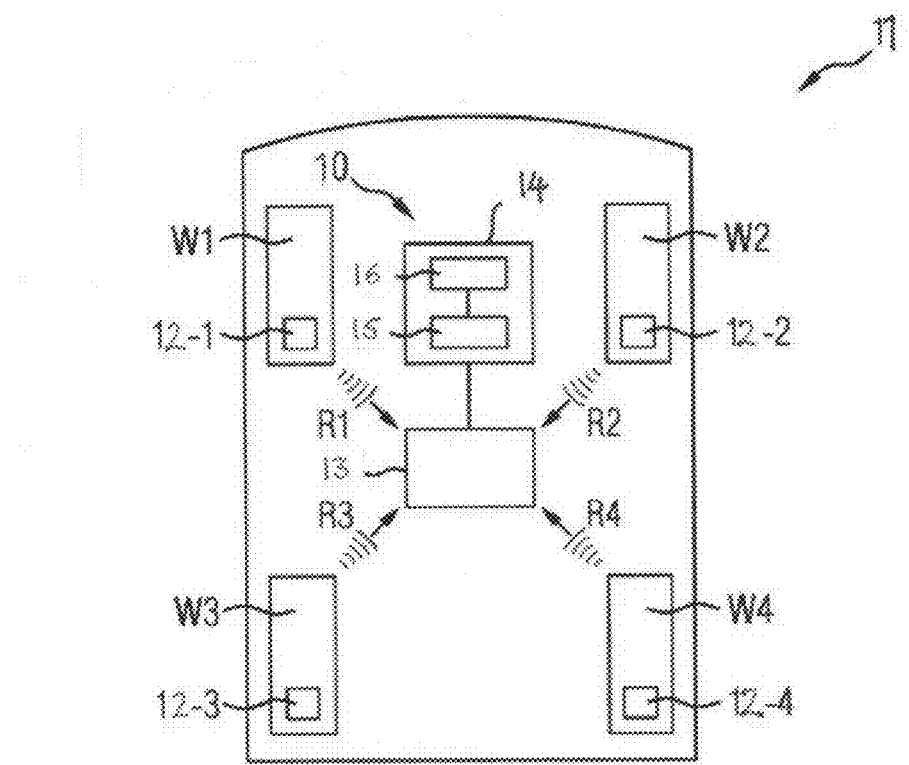
FIG. 1 is a diagrammatic, plan view of a system for determining a wet road condition.

Referring now to the figures of the drawings in detail and first, particularly, to FIG. 1 thereof, there is seen a diagrammatic view of a system 10 for determining a wet road condition. The system 10 is used on and may be part of a vehicle 11. The vehicle 11 includes four wheels W1, W2, W3, W4, each including a sensor 12-1, 12-2, 12-3, 12-4 associated with the respective wheel. Each sensor 12-1, 12-2, 12-3, 12-4 emits an RF signal through a respective transmitter (not illustrated) to a receiver 13 of the system 10 as indicated in FIG. 1 by R1, R2, R3, R4. The sensor 12-1, 12-2, 12-3, 12-4 may be a sensor of a tire parameter monitoring system (TPMS). The RF signal R1, R2, R4, R4 serves primarily to monitor the parameter of the tire. The received signal strength index (RSSI) of the RF signal R1, R2, R3, R4 is, however, used by the system 10 for determining the wet road condition of the vehicle 11 irrespective of any information derivable from the RF signal that is indicative of the parameter of the tire.

The system 10 includes a processing unit 14 which may include a processor 15 and a memory 16. The processing unit 14 receives the value of the RSSI of the RF signal from the receiver 13 and compares this value of the RSSI with a predetermined threshold value stored in the memory 16. If the RSSI value is lower than the predetermined value, the system 10 outputs a warning signal, either a passive warning signal, for example an audio and/or visual and/or haptic signal to a driver of the vehicle 11 or outputs a warning signal to a further active vehicle control system of the vehicle 11 such as an ABS or ESP system.

The RSSI of an RF signal depends on the atmospheric conditions between the transmitter i.e. the transmitter in each of the sensors 12-1, 12-2, 12-3, 12-4 and the receiver 13. The RSSI of the RF signal R1, R2, R3, R4 is larger in dry conditions than in wet conditions due to the phenomenon of rain fade. Since the sensor 12-1, 12-2, 12-3, 12-4 is positioned on the respective wheel W1, W2, W3, W4 of the vehicle 11 and the wheel W1, W2, W3, W4 comes in contact with a wet road surface, the RF signal emitted by the sensor 12-1, 12-2, 12-3, 12-4 is affected by wet conditions so that the RSSI of the RF signal is lower in wet conditions than in dry conditions. Therefore, by determining the RSSI of the RF signal from the sensors 12-1, 12-2, 12-3, 12-4, and comparing this value to a known predetermined threshold value, such as the RSSI for that sensor in dry conditions or some other predetermined threshold value, wet conditions and a wet road condition that is indicative of an increased risk of aquaplaning can be determined.

Figure 2:
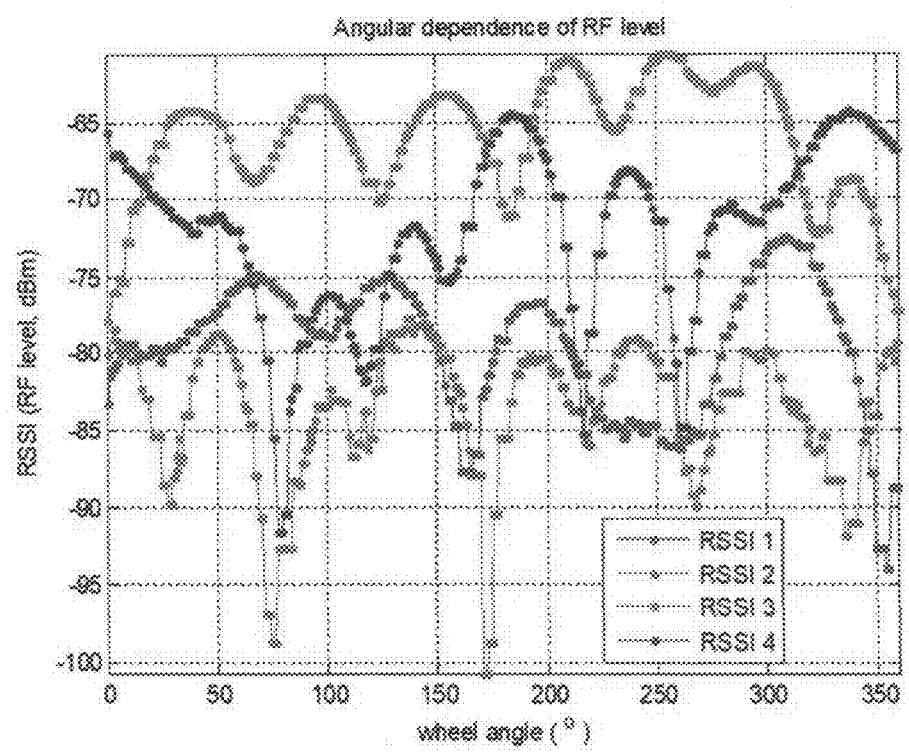
FIG. 2 is a graph of RSSI of an RF signal transmitted from a sensor associated with a wheel of the vehicle as a function of the rotational angle of the wheel.
Figure 3:
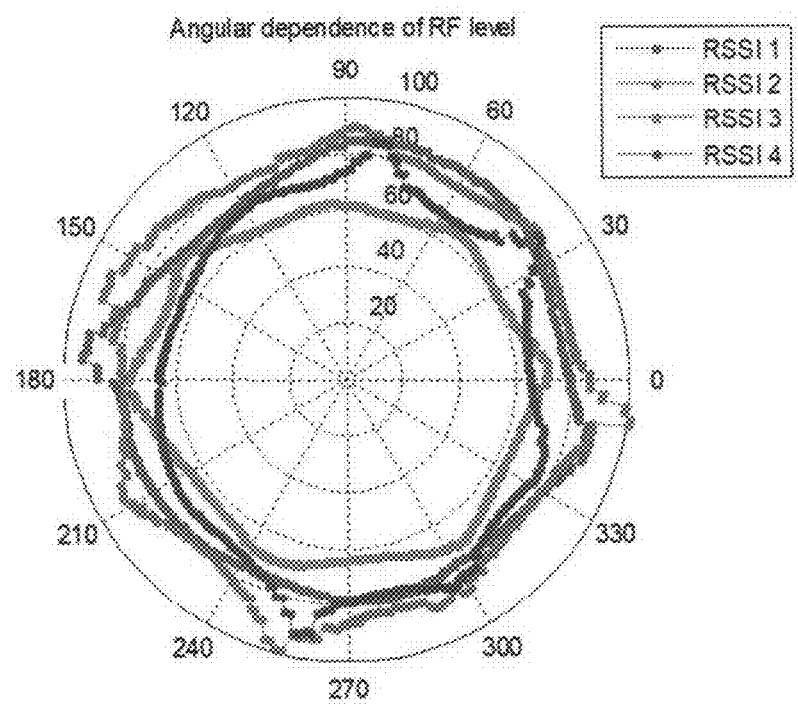
FIG. 3 is a graph of the RSSI of an RF signal transmitted from the sensor using polar coordinates.

FIG. 2 illustrates a graph of measured values of the RSSI of a sensor attached to a wheel of a vehicle as a function of the angle of the rotational angle of the wheel. FIG. 3 illustrates a polar graph of these values.

The RSSI value for the RF signal from a sensor associated with each of the four wheels of the vehicle is shown indicating that the average RSSI value is different for each wheel since the transmission path between each of the sensors and the receiver differs. For example, the distance between the sensor and the receiver 13 may differ for the different wheels. The materials through which the RF signal from each of the sensors is transmitted to the receiver may also be different leading to different average values of the RSSI for different wheels of the vehicle.

FIGS. 2 and 3 also indicate that the value of the RSSI may be dependent on the rotational angle of the wheel around its axis. In some embodiments, an average value of the RSSI value may be calculated by collecting values of the RSSI on dry conditions for that particular wheel over a period of time and an average value of the RSSI independent of the wheel angle may be used as the predetermined threshold value or as a reference value for determining the predetermined reference value.

In some embodiments, an angular dependent value of the RSSI in dry conditions for that wheel may be used as an angular dependent predetermined threshold value or as a reference value for determining an angular dependent predetermined reference value.

In some embodiments, the RSSI value of an RF signal transmitted from a single sensor associated with a single one of the wheels may be used to determine a wet road condition. The wheel may be a driving wheel since these wheels require traction between the tire and the road to provide steering control. In some embodiments, RF signals from two or more sensors associated with two or more of the wheels may be used in the method. In some embodiments, RF signals from two sensors associated with two driving wheels may be used.

Figure 4:
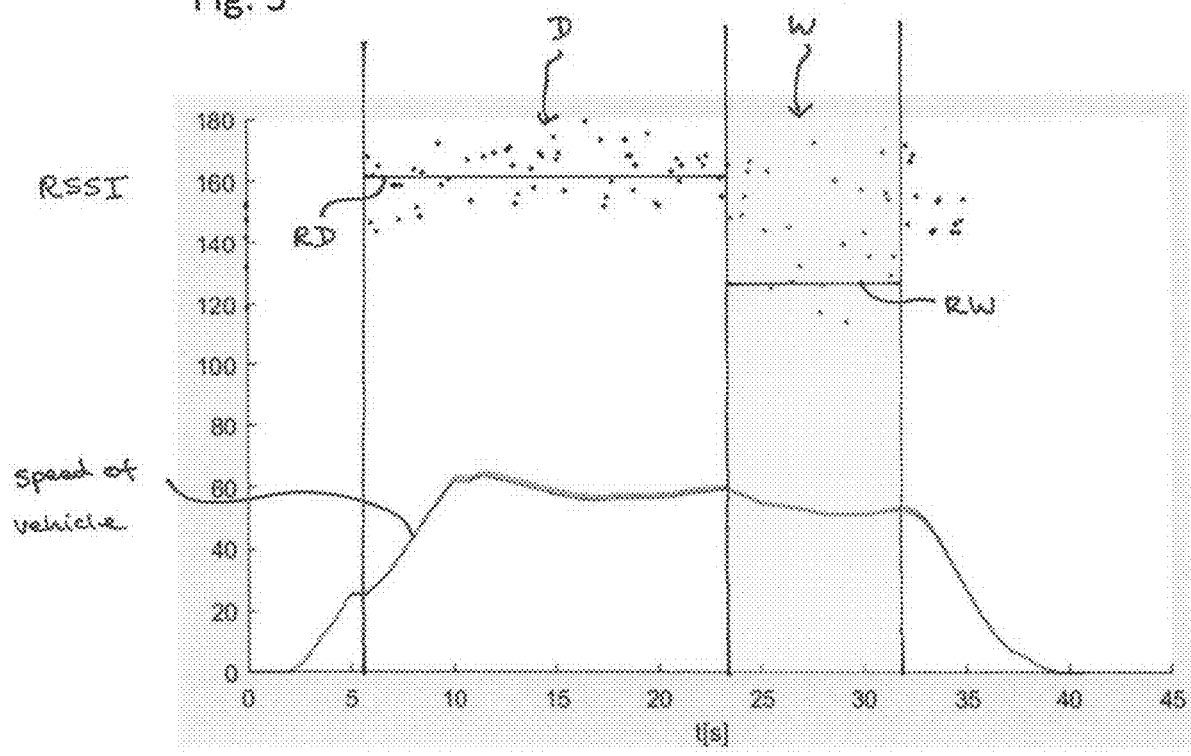
FIG. 4 is a graph of the RSSI of an RF signal received from a sensor in dry conditions and wet conditions.

FIG. 4 illustrates a graph of the RSSI value received from a sensor attached to a wheel of a vehicle during dry conditions, in region D, and in wet conditions, in region W, as a function of time. The RSSI values are indicated by dots in FIG. 4. Additionally, a solid line indicates the speed of the vehicle (in km/h) as a function of time. In the dry conditions, the average RSSI value of the RF signal received from the sensor attached to the wheel, indicated schematically by a line RD in FIG. 4, is higher than the average RSSI value, indicated schematically with a line RW, in the wet conditions. This indicates that by determining the value of the RSSI of the RF signal and determining whether the value is less than a predetermined value, e.g. RD, the presence of wet conditions can be determined and, therefore, if a wet road condition is met. The determination of a wet road condition can be taken as an indication that there is an increased risk of aquaplaning.

In other embodiments, the predetermined value may be selected to be between the values RD and RW, since aquaplaning is more likely to occur in very wet conditions, which would lead to a lower RSSI for the RF signals, than in less wet conditions.

Figure 5:
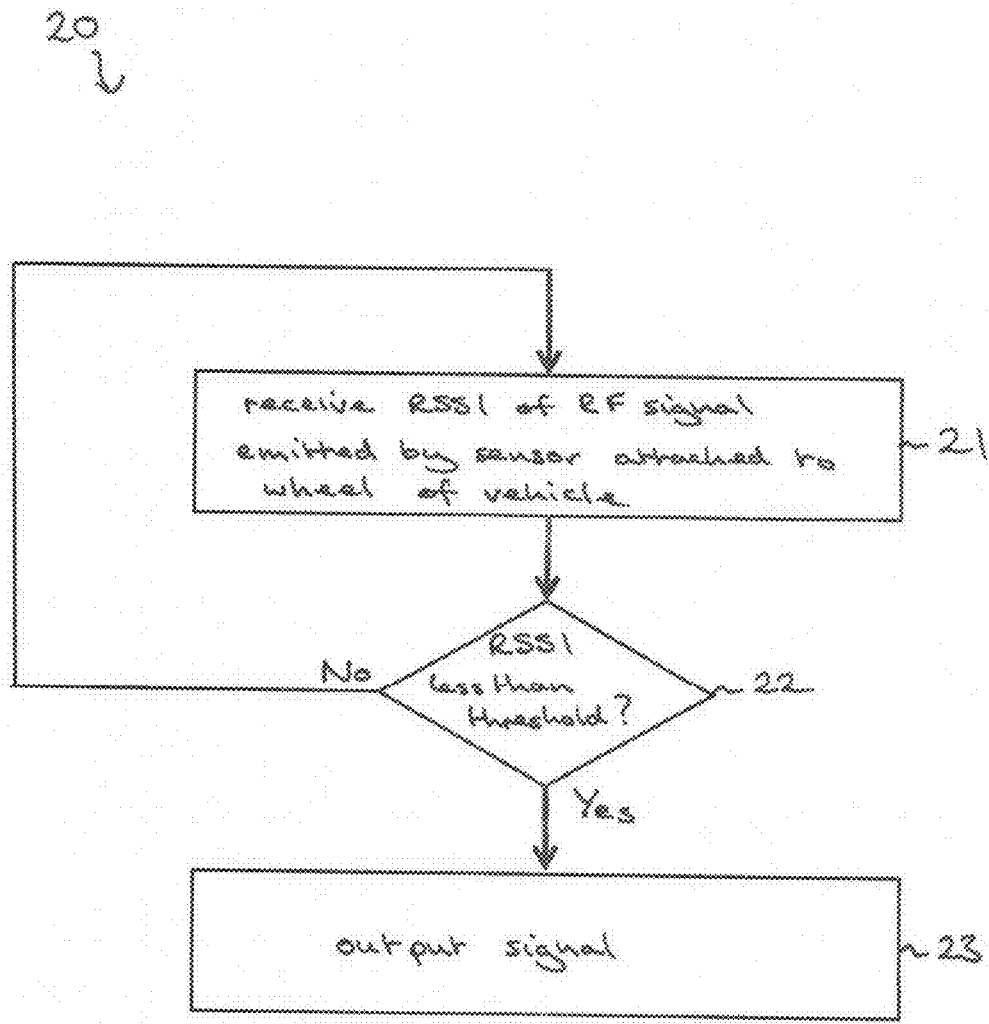
FIG. 5 is a flow chart of a method for determining a wet road condition.

FIG. 5 illustrates a flowchart 20 of a method for determining a wet road condition of the vehicle. In block 21, a value of the Received Signal Strength Index (RSSI) of an RF signal emitted from a sensor associated with a wheel of a vehicle is received. In decision diamond 22, the value of the RSSI is compared to a predetermined threshold value. If the value is less than the predetermined threshold value (Decision YES), the method determines that a wet road condition is met and proceeds to block 23 and outputs a pre-aquaplaning warning signal. If the value is greater than or equal to the predetermined threshold value (Decision NO), the method continues by receiving a further RSSI value of a further RF signal emitted from the sensor or a further sensor associated with a further wheel of the vehicle and the method described by the flowchart is repeated.

To summarize, the effect of rain on the transmission properties and strength of an RF signal is used to provide pre-aquaplaning detection.

In an embodiment, the RSSI of the RF signal is sampled at some speed and at random times with respect to the wheel's rotation and its average value is calculated and stored for that wheel. A sufficient number of samples is used so that the variation in the angular variation is removed. When the road becomes humid or wet and splash occurs, a decrease in the average RSSI with respect to the stored reference value is determined from which the presence of water can be determined. This determination of the presence of water can be used in conjunction with other indications of wet conditions, for example a signal from a rain sensor on the windshield of the vehicle which indicates rain to determine a wet road condition.

In a further embodiment, high-speed sampling of the RSSI is used. The RSSI value is measured together with the wheel rotation angle as provided by the ESP/ABS sensor. Average values and the standard deviation depending on the rotation angle are calculated and stored as reference values, when the road is known to be dry, in a chosen number of bins. This phase of the method can be referred to as the learning phase. Afterwards, the RSSI and its corresponding angle continue to be measured. If, at some point, the RSSI decreases below an acceptable range, as determined from the stored mean value and standard deviation, the presence of water is suspected. The method continues and, if the behavior is maintained over many angle bins until a sufficient likelihood is obtained, a signal for water presence is validated.

The following is a summary list of reference numerals and the corresponding structure used in the above description of the invention:
10 system
11 vehicle
12-1 sensor
12-2 sensor
12-3 sensor
12-4 sensor
13 receiver
14 processing unit
15 processor
16 memory
20 flow chart
21 block
22 decision diamond
23 block
R1, R2, R3, R4 RF signal
W1, W2, W3, W4 wheel

The invention claimed is:

1. A method for determining a wet road condition, the method comprising:
receiving by a processing unit a value of a received signal strength index of an RF signal emitted from a sensor associated with a wheel of a vehicle;
comparing by the processing unit the value to a predetermined threshold value;
upon the value being less than the predetermined threshold value, determining that a wet road condition is met and outputting a pre-aquaplaning warning signal; and
establishing a reference received signal strength index for dry conditions for a particular wheel in dependence on an angular position of a particular wheel.

2. The method according to claim 1, which further comprises receiving the RF signal from the sensor and determining the received signal strength index of the RF signal.

3. The method according to claim 1, which further comprises determining a reference received signal strength index for dry conditions during predetermined dry conditions.

4. The method according to claim 3, which further comprises setting the predetermined threshold value at a value being less than the reference received signal strength index for dry conditions.

5. The method according to claim 1, which further comprises using a sensor of a tire parameter monitoring system attached to the wheel of the vehicle as the sensor.

6. The method according to claim 1, which further comprises at least one of:
using the pre-aquaplaning warning signal to trigger a passive warning to a driver of the vehicle, or
transmitting the pre-aquaplaning warning signal to an active vehicle control system of the vehicle, or
transmitting the pre-aquaplaning warning signal to another object external to the vehicle.

7. The method according to claim 1, which further comprises:
providing the wheel and a further wheel as driving wheels of the vehicle;
receiving a further value of the received signal strength index of an RF signal emitted from a further sensor associated with the further wheel of the vehicle;
comparing the further value to a further predetermined threshold value; and
upon the further value being less than the further predetermined threshold value, determining that the wet road condition is met and outputting the pre-aquaplaning warning signal.

8. A method for determining a wet road condition, the method comprising:
receiving by a processing unit a value of a received signal strength index of an RF signal emitted from a sensor associated with a wheel of a vehicle;

comparing by the processing unit the value to a predetermined threshold value;
upon the value being less than the predetermined threshold value, determining that a wet road condition is met and outputting a pre-aquaplaning warning signal;
receiving at least one additional signal indicative of a wet road condition or of a pre-aquaplaning condition; and
in response to the at least one additional signal and the value of the received signal strength index of the received RF signal being lower than the predetermined threshold value, determining that a pre-aquaplaning condition is met and outputting the pre-aquaplaning warning signal.

9. The method according to claim 8, wherein the additional signal includes a positive signal from a camera detecting a wet road, or a positive signal from a rain sensor associated with a windshield of the vehicle.

10. A system for determining a wet road condition, the system comprising:
at least one sensor emitting an RF signal, said at least one sensor being attached to a wheel of a vehicle;
a receiving unit for receiving the RF signal from said at least one sensor;
a memory storing a predetermined threshold value of a received signal strength index; and
a processing unit for determining a received signal strength index of the RF signal and for comparing the received signal strength index of the RF signal with the predetermined threshold value stored in said memory, and upon the received signal strength index being lower than the predetermined threshold value, outputting a pre-aquaplaning warning signal, said processing unit establishing a reference received signal strength index for dry conditions fora particular wheel in dependence on an angular position of a particular wheel.

11. The system according to claim 10, which further comprises an outputting unit receiving the pre-aquaplaning warning signal and outputting a passive warning signal to at least one of:
a driver of the vehicle, or
an active vehicle control system of the vehicle, or
a further vehicle, or
a further object external to the vehicle.

12. The system according to claim 10, wherein said at least one sensor is part of a tire parameter monitoring system, and said at least one sensor senses at least one of tire pressure, tire temperature, tire radial acceleration or tire tangential acceleration.

13. A non-transitory computer-readable medium with instructions stored thereon, that when executed by a processor, perform steps for determining a wet road condition by:
receiving by a processing unit a value of a received signal strength index of an RF signal emitted from a sensor associated with a wheel of a vehicle;
comparing by the processing unit the value to a predetermined threshold value;
upon the value being less than the predetermined threshold value, determining that a wet road condition is met and outputting a pre-aquaplaning warning signal; and
establishing a reference received signal strength index for dry conditions for a particular wheel in dependence on an angular position of a particular wheel.

14. A non-transitory computer-readable medium with instructions stored thereon, that when executed by a processor, perform steps for determining a wet road condition by:
receiving by a processing unit a value of a received signal strength index of an RF signal emitted from a sensor associated with a wheel of a vehicle;
comparing by the processing unit the value to a predetermined threshold value;
upon the value being less than the predetermined threshold value, determining that a wet road condition is met and outputting a pre-aquaplaning warning signal;
receiving at least one additional signal indicative of a wet road condition or of a pre-aquaplaning condition; and
in response to the at least one additional signal and the value of the received signal strength index of the received RF signal being lower than the predetermined threshold value, determining that a pre-aquaplaning condition is met and outputting the pre-aquaplaning warning signal.

15. A system for determining a wet road condition, the system comprising:
at least one sensor emitting an RF signal, said at least one sensor being attached to a wheel of a vehicle;
a receiving unit for receiving the RF signal from said at least one sensor;
a memory storing a predetermined threshold value of a received signal strength index;
a processing unit for determining a received signal strength index of the RF signal and for comparing the received signal strength index of the RF signal with the predetermined threshold value stored in said memory, and upon the received signal strength index being lower than the predetermined threshold value, outputting a pre-aquaplaning warning signal;
said processing unit receiving at least one additional signal indicative of a wet road condition or of a pre-aquaplaning condition; and
in response to the at least one additional signal and the value of the received signal strength index of the received RF signal being lower than the predetermined threshold value, said processing unit determining that a pre-aquaplaning condition is met and outputting the pre-aquaplaning warning signal.

* * * * *